United States Patent
Stroope (10) Patent No.: US 8,567,823 B2
(45) Date of Patent: Oct. 29, 2013

(54) FIRE HOSE CONNECTION ADAPTOR

(76) Inventor: Jeffrey M. Stroope, Cabot, AR (US)

( * ) Notice: Subject to any disclaimer, the term of this patent is extended or adjusted under 35 U.S.C. 154(b) by 515 days.

(21) Appl. No.: 12/661,780

(22) Filed: Mar. 24, 2010

(65) Prior Publication Data

US 2010/0244435 A1 Sep. 30, 2010

Related U.S. Application Data (60) Provisional application No. 61/211,131, filed on Mar. 30, 2009.

(51) Int. Cl.
*F16L 55/00* (2006.01)

(52) U.S. Cl.
USPC .......... 285/148.19; 285/34; 285/38; 285/360; 285/411

(58) Field of Classification Search
USPC ........ 285/33–34, 148.19, 148.2, 148.21, 360, 285/362, 376–377, 401, 411, 38, 315–317
See application file for complete search history.

(56) References Cited

U.S. PATENT DOCUMENTS

| | | | |
|---|---|---|---|
| 686,390 A * | 11/1901 | Cox | 285/34 |
| 1,761,157 A * | 6/1930 | Schellin | 285/34 |
| 1,920,524 A | 8/1933 | Reed | |
| 2,001,244 A | 5/1935 | Ezell | |
| 2,267,252 A | 12/1941 | Pitsch | |
| 2,333,243 A * | 11/1943 | Glab | 285/33 |
| 3,224,800 A * | 12/1965 | Fisher | 403/118 |
| 3,635,501 A | 1/1972 | Thorne-Thomsen | |
| 6,733,045 B2 * | 5/2004 | Harrington et al. | 285/148.19 |
| 6,786,516 B2 | 9/2004 | Cronley | |
| 7,140,645 B2 | 11/2006 | Cronley | |

\* cited by examiner

*Primary Examiner* — Aaron Dunwoody
*Assistant Examiner* — Fannie Kee
(74) *Attorney, Agent, or Firm* — J. Charles Dougherty (57) ABSTRACT

A quick-mounting adapter is axially forced upon and then twisted relative to threaded targets for connection. A rotatable hub has a threaded portion for connection to a hose and an integral flange fastened to a tubular sleeve coaxially within the adapter. A rotatable handle assembly comprises a rigid ring with an internal orifice and at least two outwardly projecting handle segments. A multi-segment thread assembly secured within a ring groove to the sleeve is displaceable radially inwardly and outwardly in response to a rigid, cylindrical collar secured to the handle assembly. Each segment comprises an outer tapered portion contacted by and compressed by the collar. Pushing and subsequent rotation of the handle assembly attaches the thread assembly on the threaded target to connect the adapter.

11 Claims, 11 Drawing Sheets

FIRE HOSE CONNECTION ADAPTOR

CROSS-REFERENCE TO RELATED APPLICATIONS

This utility application is based upon a prior U.S. Provisional Patent Application entitled Fire Hose Connection Adaptor, Ser. No. 61/211,131, Filed Mar. 30, 2009, by inventor Jeffrey M. Stroope, and priority based upon said application is claimed. Such application is incorporated herein in its entirety.

BACKGROUND OF THE INVENTION

The present invention relates generally to connection adaptors for hoses. More particularly, the present invention relates to connecting apparatus with multiple, coordinated coupling threads that enable a fire hose to be quickly coupled to a fire hydrant or fire truck.

Means have been provided in the prior art for quick connecting fire hoses.

U.S. Pat. Nos. 6,786,516 and 7,140,645 respectively issued to Cronley on Sep. 7, 2004 and Nov. 28, 2006 show quick-connecting couplers for attaching the male end of a hose to a female end of a suitable receptacle, including a faucet or another hose. In first embodiments, the female end of the coupler is mechanically locked in sealing engagement with a male end by means of wedges and an outer retaining sleeve. In a second embodiment, hydraulic pressure provides the final seal, with the female end being a spring split-ring locked and compressed by means of an outer locking sleeve. The depicted designs use four segments that, when attached, have around 70% combined thread contact, limiting high pressure applications.

U.S. Pat. No. 2,001,244 to Ezell shows a design that is permanently fastened to a hose with a swedge type connection and connects to a hydrant using a cam not a slide with segments. This design would be permanently attached to the hose and would not be removable after assembled. This design would not be able to withstand high pressure.

Thomson U.S. Pat. No. 3,635,501 discloses segment that expands over the threads by pressing forward. For attachment, the coupler is pressed over the male threads which will distort an segment, that will then retract into place over the male threads of the element. Designs of this nature have been unable to withstand high pressure.

Other quick-connecting couplers of interest are seen in U.S. Pat. Nos. 1,761,157, 1,920,524 and 2,267,252.

Under the pressure of fire fighting, the connecting adapter hose adapters must function reliably and quickly. Threads must mate with the hydrants or other fixtures to which they are attached, and mechanical connection must withstand high pressure. It is important that thread contact be maximized, but at the same time, it is important that after use, the adaptor be easily and quickly detachable without damaging fitting threads.

BRIEF SUMMARY OF THE INVENTION

This invention provides an improved quick connection adaptor for fire hose connections and the like.

A compressible thread assembly comprising multiple, radially spaced apart segments first engages a target thread. A handle assembly drives a collar that compresses the thread segments radially inwardly upon axial installation pressure. Subsequent turning of the handle assembly threadably rotates the threads to secure the connection.

Thus a basic object is to provide a quick connecting hose connector or coupling.

Another basic object of my invention is to provide a device that allows a person to connect a fire hose to a hydrant or fire truck at a faster rate of speed than is presently done.

A related object of my invention is to provide a device that allows a person to disconnect a fire hose from a hydrant at a faster rate of speed than is presently done.

Another object is to maximize the thread contact established by "quick connectors" used in fire fighting and the like.

Similarly, it is an object of my invention to maximize the high pressure capabilities of quick connectors of the type discussed.

A still further object of my invention is to provide a connector device of the character described that minimizes cross threading and thread damage.

Another object of my invention is to provide a quick-connecting device that can be quickly removed from a hose if the hose fails to pass critical pressure tests.

Another object of my invention is to provide a connecting device that will be easily utilized with very little training.

Another objective of the present invention to provide a quick-connecting hose coupler which is highly reliable and suitable for quick connections and disconnections where the operator is under stress and facing emergency situations.

Another objective of the present invention to provide a connector adaptor or hose coupler that quickly locks in place mechanically without cross threading.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE PREFERRED EMBODIMENTS

Figure 1:
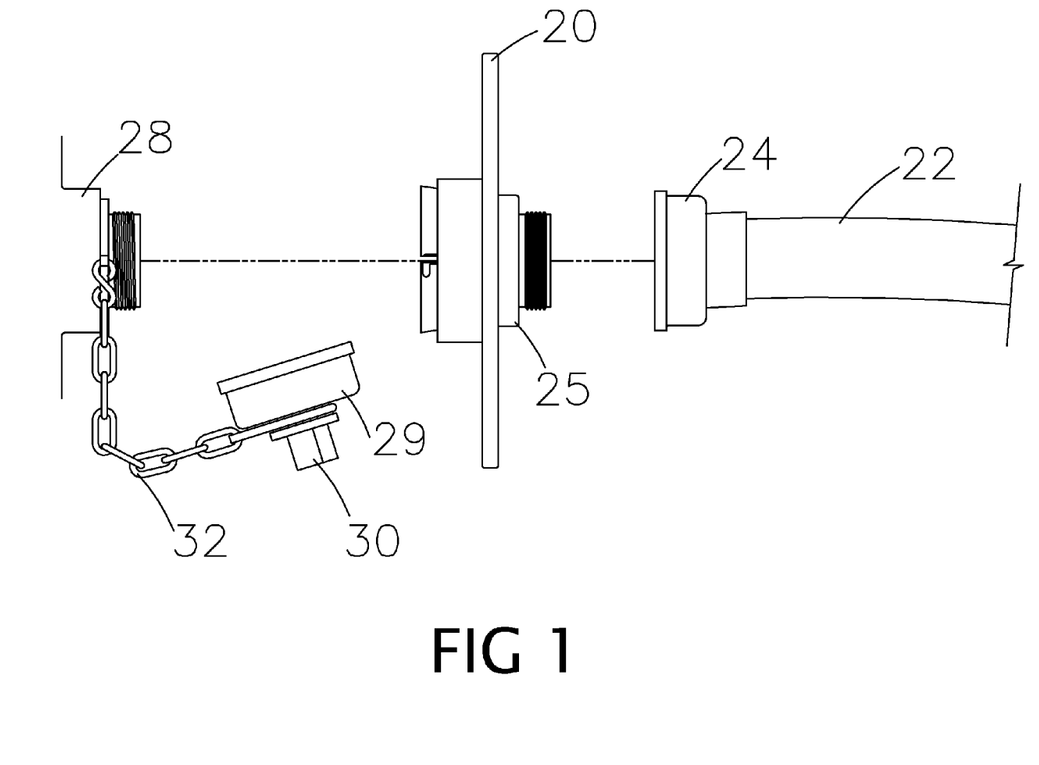
FIG. 1 is a fragmentary, partially exploded elevational view showing the coupling relationship between a typical fire hydrant, the instant coupler and a remote hose.
Figure 2:
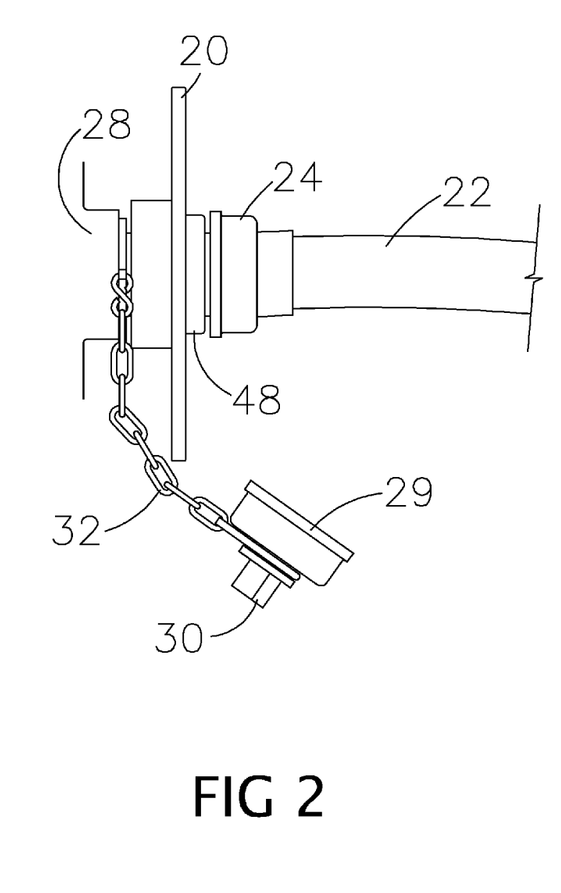
FIG. 2 is a fragmentary, partially exploded elevational view similar of FIG. 1, but showing the coupler attached to the hydrant.
Figure 3:
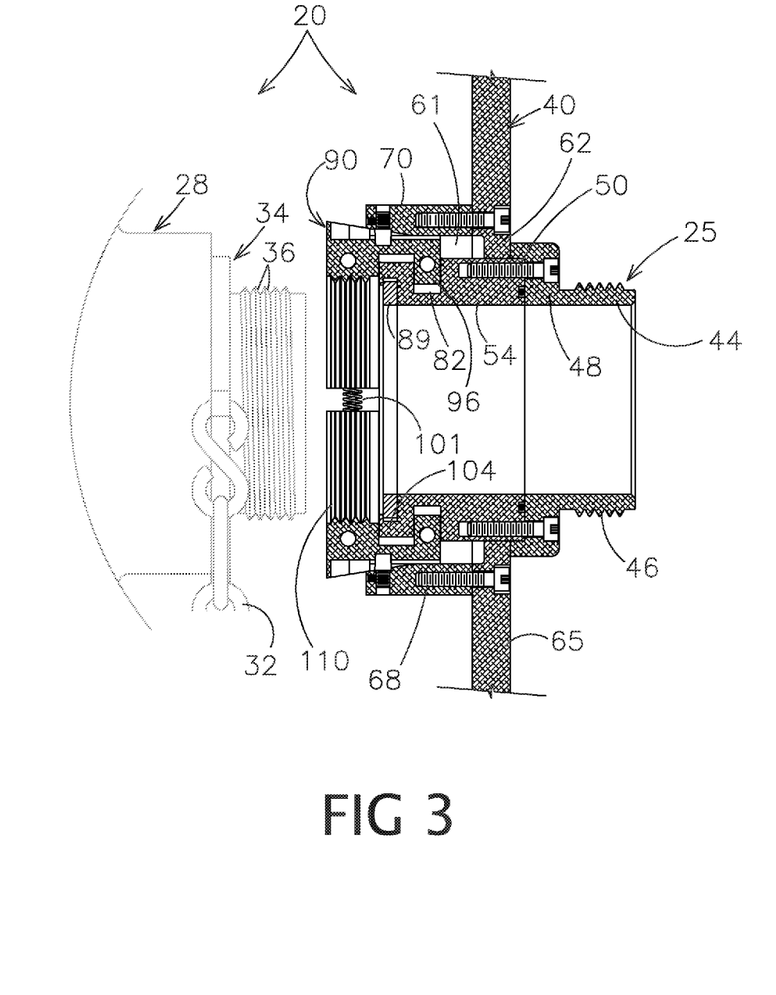
FIG. 3 is an enlarged, combined elevational and longitudinal sectional view, showing the hose coupler as it appears prior to connecting with a threaded hydrant fitting, with potions thereof broken away for clarity or brevity.

With initial reference directed to FIGS. 1-3 of the appended drawings, a hose connecting adapter constructed generally in accordance with the best mode of the invention has been generally designated by the reference numeral 20. The connecting adapter is adapted to be coupled to a conventional fire hose 22 used by fireman. Hose 22 has a conventional, threaded coupling 24 that is adapted to be threadably connected to the threaded hub 25 on the rear of the hose connecting adapter 20 as later described. A conventional fire hydrant 28 (FIG. 1) is illustrated with its high pressure cap 29 installed. Cap 29 must first be removed with a special wrench applied to nut 30 for removal in the conventional fashion. As seen in FIG. 2, when the cap 29 is removed, it can fall safely to a lower, out-of-the way position, being restrained by chain 32. Removal of the cap 29 exposes the hydrant fitting 34 (FIG. 3) and threads 36. With the hydrant thus opened, the connecting adapter 20 is forcibly pushed towards and over the threads 36, and the internal thread segments on connecting adapter 20 described later "snap fit" over hydrant threads 36. When adapter 20 is thus partially connected, it is rotated with handle assembly 40 and as rotation occurs as in FIGS. 9-11, the installed connecting adapter 20 assumes the position of FIG. 4.

Figure 4:
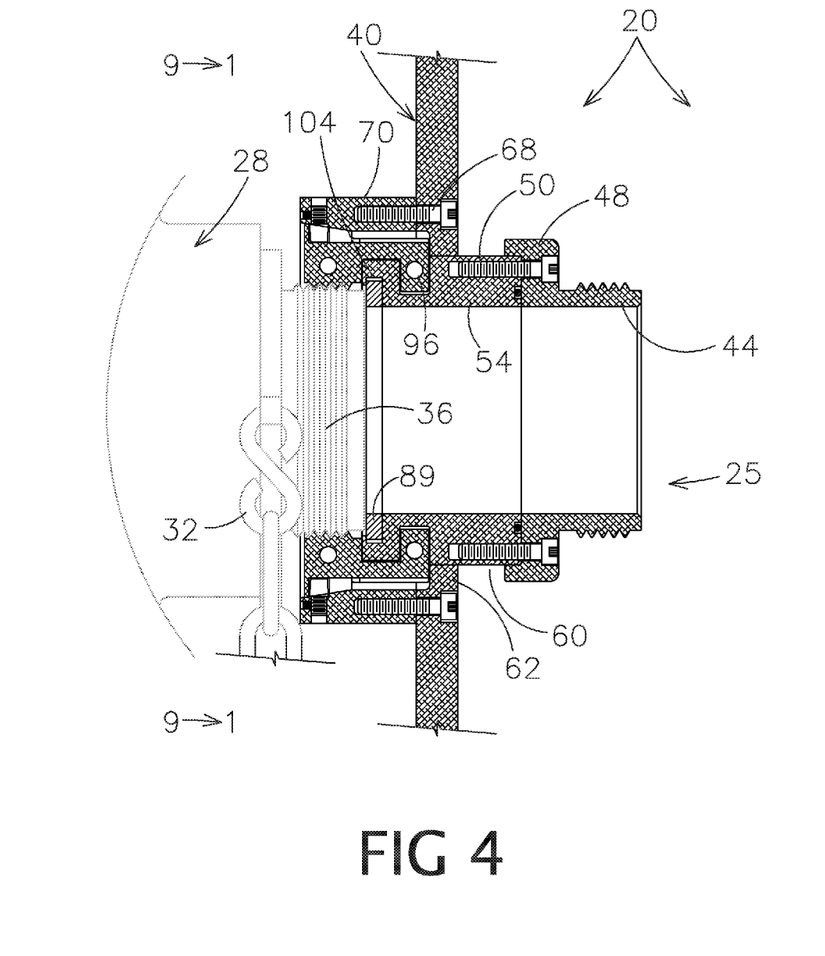
FIG. 4 is an enlarged, longitudinal sectional view of the fitting as it appears prior to connecting with a threaded fitting, with potions thereof broken away for clarity or brevity.
Figure 5:
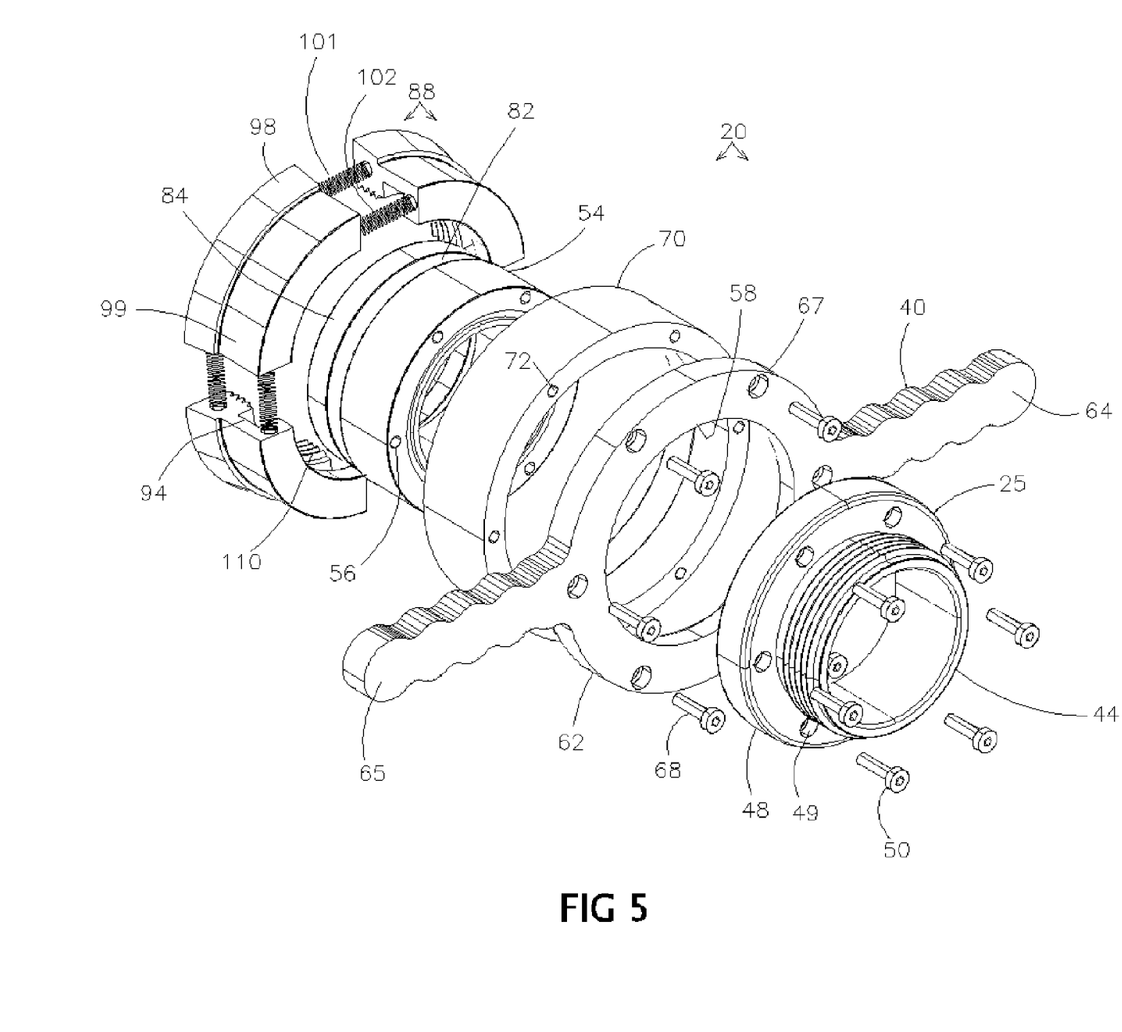
FIG. 5 is an enlarged, exploded isometric view of the connector.
Figure 6:
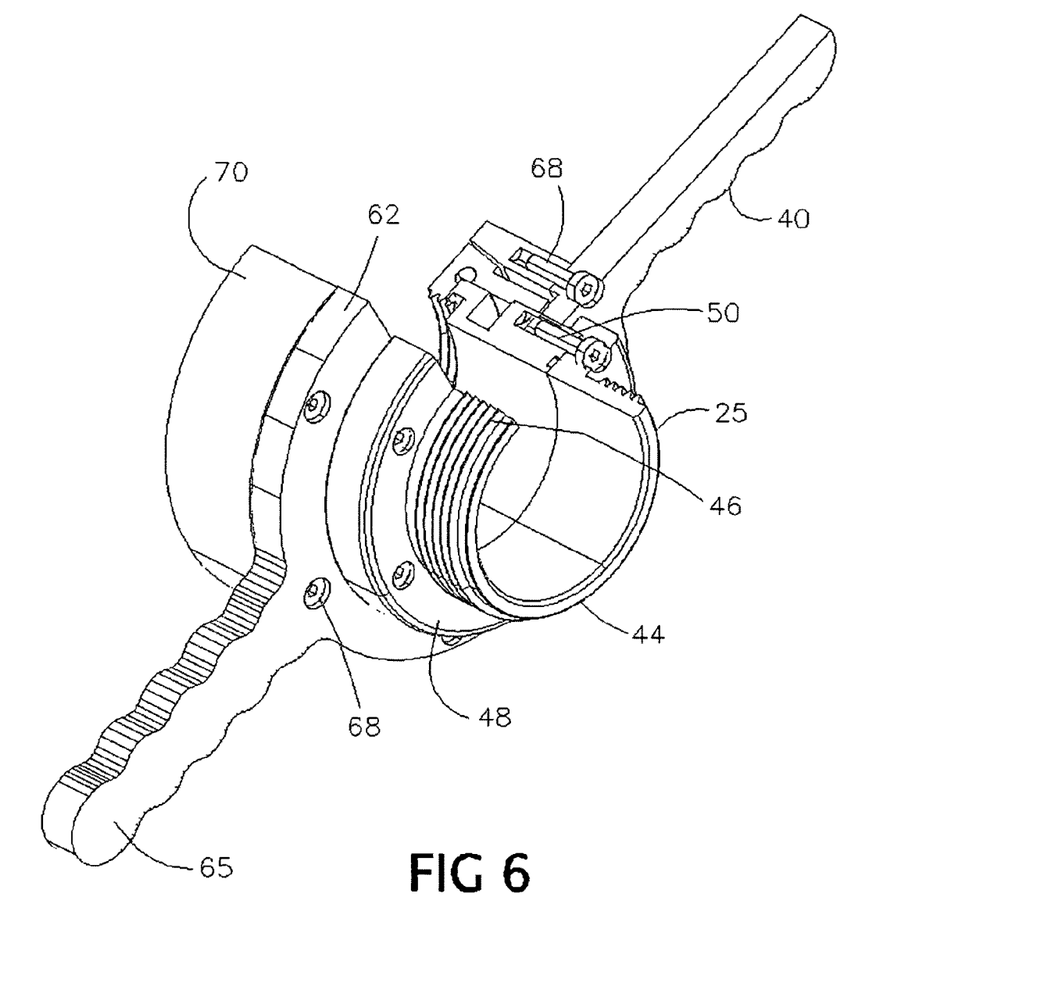
FIG. 6 is a fragmentary, isometric view of the handle assembly, showing the hose receptacle hub and the collar.

With joint reference now directed to FIGS. 3-7, the threaded hub 25 comprises an outer, threaded tubular portion 44 whose threads 46 mate with conventional, internal threads in coupling 24. Tube portion 44 is integral with a larger diameter, coaxial flange 48, which includes a plurality of radially spaced apart orifices 49 (FIG. 5). Hub flange 48 is connected by screws 50 (i.e., that penetrate orifices 49) to a rigid, internal sleeve 54 (i.e., FIGS. 3, 5). Screws 50 engage radially spaced apart orifices 56 (FIG. 5) in the sleeve end. Hub 25 and its flange 48 are thus coaxial with and mated to sleeve 54. The assembly comprising hub 25 and sleeve 54 are rotatable relative to the handle assembly 40. Sleeve 54 penetrates the handle assembly orifice 58 and while it can normally rotate relative to the handle assembly 40, it is axially restrained by abutment of hub flange 48 with handle assembly 40 (i.e., FIG. 3). Sleeve 54 secures critical screw segments discussed hereinafter. Relative axial displacement between the sleeve 54 and the handle assembly 40 is illustrated by comparing FIGS. 3 and 4; an external gap 60 (FIG. 4) between the flange 48 of hub 25 and the handle assembly 40 exists when the coupler 20 is installed. Prior to installation there is no external gap 60, and instead an internal gap 61 (FIG. 3) exists between the handle assembly ring 62 and the threaded elements discussed later.

The handle assembly 40 comprises a rigid ring 62 from which a pair of operating handle segments 64, 65 outwardly projecting from ring 62. Ring 62 surrounds orifice 58 through which hub 25 projects. A plurality of radially spaced-apart orifices 67 defined in the periphery of the handle ring 62 receive threaded fasteners 68. A rigid, cylindrical collar 70 has radially spaced apart, threaded orifices 72 (FIG. 5) that seat fastener 68 to coaxially secure the handle assembly 40 to collar 70. Ring 62 is thus secured to, and coaxially abuts collar 70, which is controlled by handle movement during installation or disconnection of the adapter 20.

Figure 7:
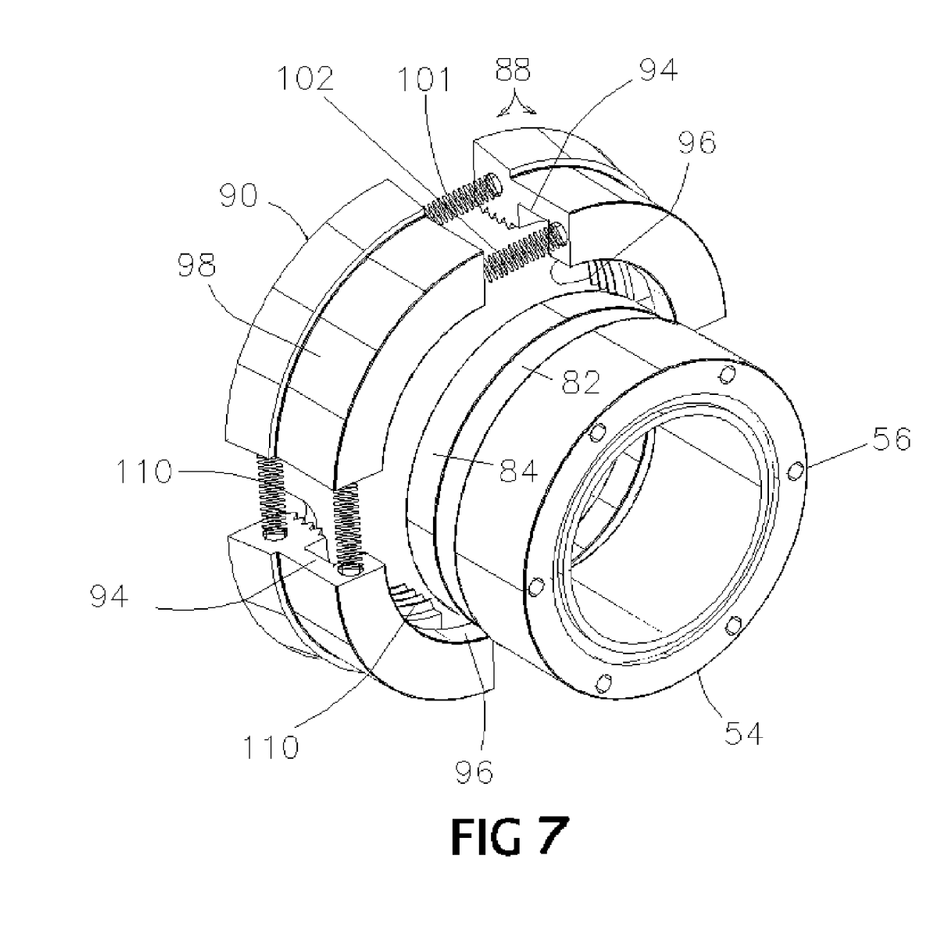
FIG. 7 is a partially exploded, isometric view of the preferred control sleeve with the peripheral, thread contacting segments expanded about their periphery for illustration.
Figure 8:
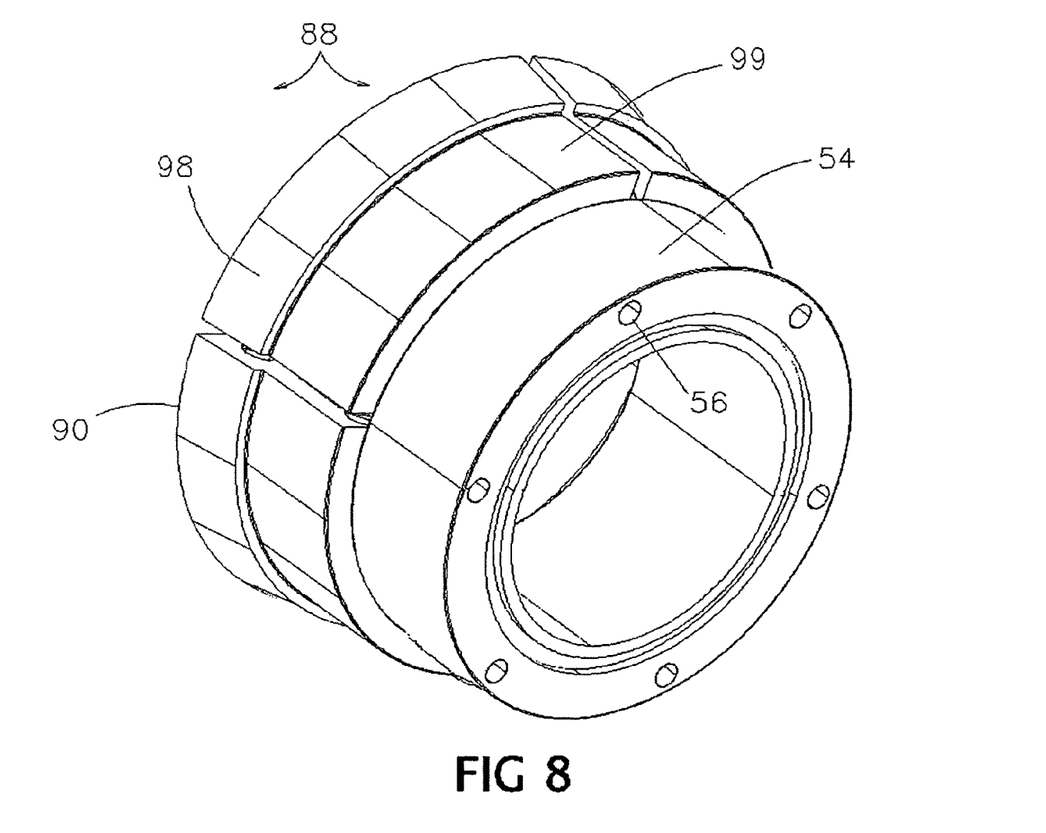
FIG. 8 is an isometric view similar to FIG. 7 showing the threaded segments contracted into position about the radial periphery of the control sleeve.

The previously discussed sleeve 54 is secured to front hub 25 and rotatable within handle ring 62. As best seen in FIGS. 5 and 7, sleeve 54 includes a peripheral ring groove 82 adjacent its terminal end 84 that receives and mounts the thread assembly 88 that ultimately engages threads 36 (FIG. 3). Preferably there is a concentric, resilient O-ring 89 (FIGS. 3, 4) that is disposed within an inner ring groove at the end of sleeve 54.

The thread assembly 88 preferably comprises a plurality of radially spaced-apart, internal thread segments 90, preferably four, that are interconnected with one another and function in unison. Each segment 90 comprises an internal ring groove 94 (FIG. 7) bounded by integral, internal feet 96 that fit within sleeve ring groove 82. The body of each thread segment 90 comprises an outer tapered portion 98 integral with a concentric inner body portion 99 that is non-tapered. Adjoining thread segments 90 are coupled together by pairs of springs 101, 102 at the segment ends, that bias the segments towards each other, and maintain the foot portions concentrically within sleeve ring groove 82. The sleeve terminus 104 (i.e., part of the sleeve 54) concentrically fits within the internal ring groove 94 of the various thread segments 90. In assembly, collar 70 (that is controlled by handle assembly 40) coaxially surrounds the thread assembly 88.

Relative movement of the handle assembly 40 towards the left (i.e., as viewed in FIG. 3) initially results in axial pressure against the thread assembly 88 that forces the segments 90 over the threads, such as threads 36, of a fitting to which the adapter 20 is to be connected. As pressure continues, collar 70 slides over tapered portions 98 of the thread segments 90, forcing them to contract against pressure from springs 101, 102, and form a smaller diameter. Contraction of segments 90 forces their internal threads 110 into engagement with threads 36. A comparison of FIGS. 3 and 4 shows that, prior to attachment, adjoining segments 90 are spaced apart with springs 101 elongated; segment feet 96 (FIG. 3) are only partially pressed into ring groove 82 on sleeve 54. The combined segments 90 thus present a relatively large diameter opening that surmounts threads 36 quickly and easily upon initial installation.

When the handle assembly 40 is pressed axially towards the fire hydrant 28 and thereafter rotated, resulting in the position seen in FIG. 4, threads 36 are firmly engaged by the internal threads 110 of the segments 90, which move closer to one another in response to force from collar 70 that bears against the tapered segment portions 98. Segment feet 96 are pressed into ring groove 82 in the sleeve 54, and as the threaded segments 90 are forced into the collar 70 by axial deflection, internal gap 61 (FIG. 3) between the thread segments 90 and the handle ring 62 disappears, and external gap 60 (FIG. 4) appears.

Figure 9:
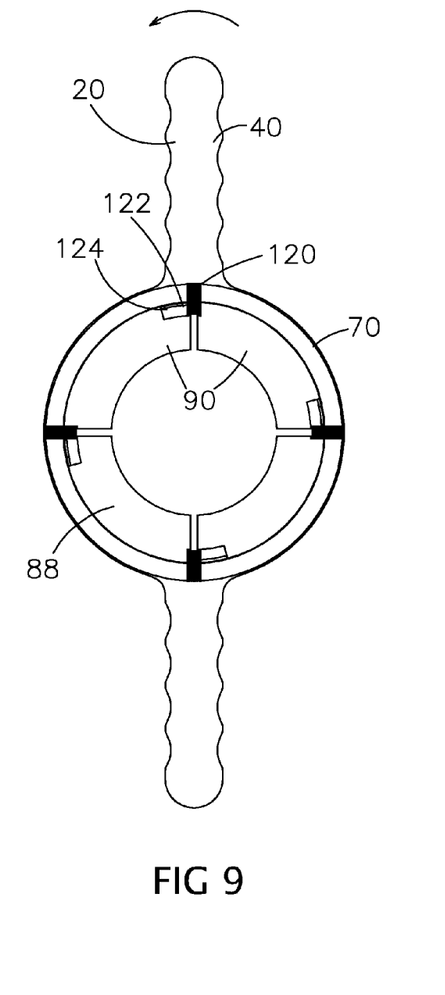
FIG. 9 is an elevational view taken generally from a position to the left of FIG. 4, showing a first stage of installation of the connector; and, FIGS. 10 and 11 are views similar to FIG. 9 showing succeeding positions of the connector assumed during installation.
Figure 10:
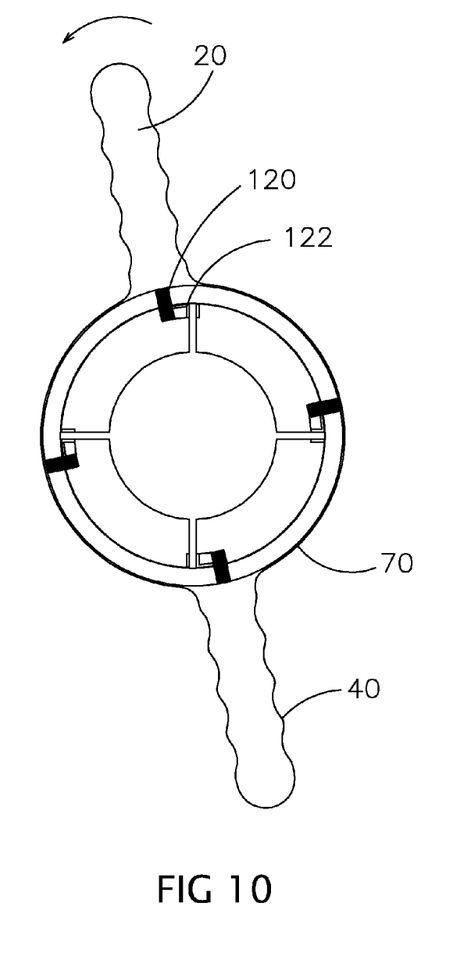
Figure 11:
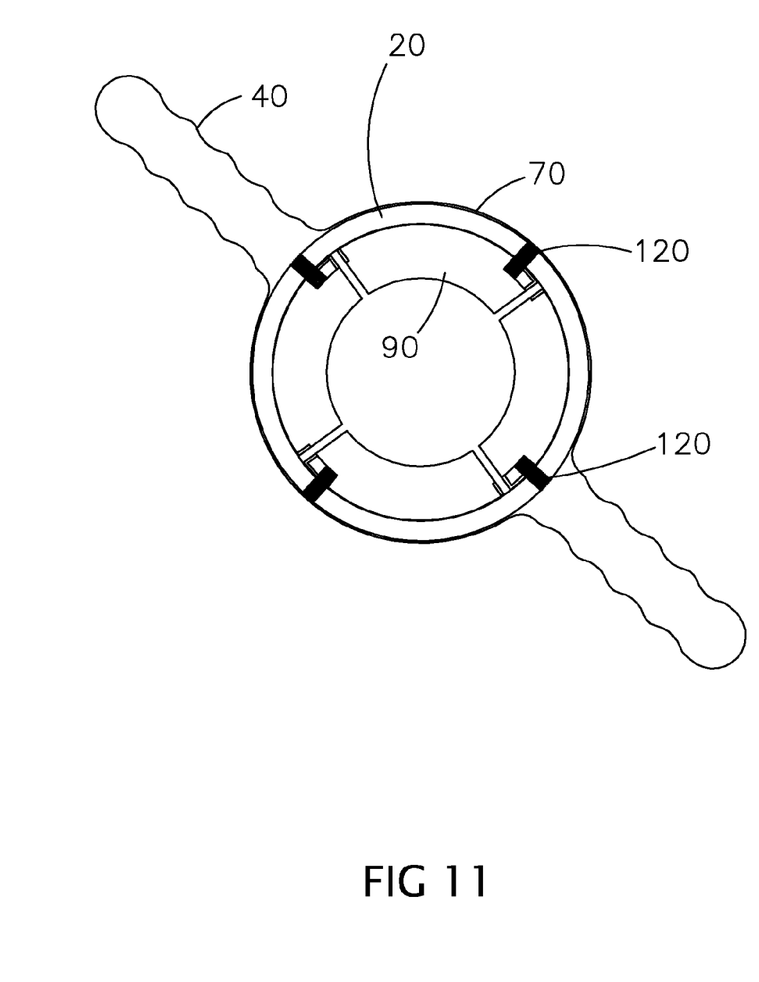

After initial axial thrusting of the adapter 20, and subsequent rotation of the handle assembly 40, the coupling thread segments 90 are firmly pressed into threadable engagement with the target fitting's threads, such as threads 36 (FIG. 3). As best seen in FIGS. 9-11, alignment pins 120 project radially inwardly from the collar 70 towards the thread segments 90. These followers move towards the viewer (i.e., as in FIG. 9) as the coupling adapter 20 is pressed towards the target threads, and when rotation ensues, the segment threads can rotatably engage the target threads. As alignment pins 120 move towards the left (i.e., as viewed in FIGS. 9-11) they first travel through slots 122 defined in the segments 90 and then abut gap ends 124 to force relative rotation of the threaded segments 90. Thus when the segments 90 are radially compressed concurrent with axial deflection, they can threadably engage the target threads 36.

To operate the coupling adapter 20 the operator first removes any existing caps 29 (FIG. 1) located on the destination point, such as hydrant 28. Then, while holding the coupling 20 by the handle assembly 40, the coupling is axially aligned with the destination. Threaded segments 90 face away from the operator. As the operator pushes the adapter over the threads, the angled surface on the threaded segments 90 engages the inner periphery of the collar 70, and the threaded segments 90 push together, compressing their threads to the correct size to provide proper connection to the destination point. The operator must insure that the alignment pins reach the notches located on the outer diameter of the threaded segments. At this point the operator can turn the handles of the adapter to tighten the adapter. This should only take approx one quarter to one half turn. If more than one quarter to one half turn is needed than the operator is improperly connecting the hose adapter to the destination point. At this point the operator is to turn the adapter to tighten until the desired torque is applied. The operator is to then try to pull against both handles to insure that the adapter will not fail and become disconnected during the pressurizing process.

It has been discovered that if the adapter is turned approximately one eighth of a turn to the left before the operator tries to turn the adapter to tighten that this will help allow the locking pins to locate in the notches. The operator will always need to pull on the adapter to ensure that the adapter will not fail and become disconnected during the pressurizing process.

To disconnect the adapter, the operator simply will have to ensure that the fluid source is turned off and the pressure is relieved, then the operator will need only to turn the handles of the adapter approx ten degrees counter clockwise and the adapter will be able to be pulled off. It is very important that the fluid source is turned off and that there is not excessive pressure on the adapter before the operator tries to remove the adapter to prevent possible serious injury.

With respect to the above description then, it is to be realized that the optimum dimensional relationship for the part of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A quick-connecting adapter for connecting to a threaded target, the adapter comprising:
   a rotatable hub comprising an outer, threaded tubular portion and an integral, coaxial flange;
   a rigid, tubular sleeve fastened to said hub flange and rotatable with said hub;
   a handle assembly that is rotatable relative to said hub, the handle assembly comprising a rigid ring concentric with said hub, the ring comprising an internal, coaxial orifice and handle segments projecting outwardly therefrom;
   said sleeve coaxially penetrating said ring orifice, the sleeve rotatable with respect to said ring;
   a rigid, cylindrical collar secured to said handle assembly ring and being rotatable with said handle assembly;
   a thread assembly secured to said sleeve, the thread assembly displaceable radially inwardly and outwardly in response to movement of said collar;
   wherein the sleeve comprises a peripheral ring groove that receives and mounts the thread assembly, and wherein the thread assembly comprises a plurality of radially spaced-apart, internally threaded, individual segments that are interconnected with one another and function in unison.

2. The adapter as defined in claim 1 wherein each segment comprises an integral, internal foot that fits within the peripheral ring groove.

3. The adapter as defined in claim 1 wherein each segment comprises an outer tapered portion adapted to be contacted by and compressed by said collar.

4. The adapter as defined in claim 1 wherein the segments are coupled together by springs that bias the segments towards each other.

5. The adapter as defined in claim 1 wherein the sleeve comprises a terminus and the segments comprise an internal ring groove, and the terminus concentrically fits within the internal ring groove of each segment.

6. The adapter as defined in claim 5 wherein each segment comprises an integral, internal foot that fits within the peripheral ring groove and wherein the segments are coupled together by springs that bias the segments towards each other.

7. The adapter as defined in claim 6 wherein each segment comprises an outer tapered portion adapted to be contacted by and compressed by said collar.

8. A quick-connecting adapter for connecting to a threaded target, the adapter comprising:
   a rotatable hub comprising an outer, threaded tubular portion and an integral, coaxial flange;
   a rigid, tubular sleeve fastened to said hub flange and rotatable with said hub;
   a handle assembly that is rotatable relative to said hub, the handle assembly comprising a rigid ring concentric with said hub, the ring comprising an internal, coaxial orifice and handle segments projecting outwardly therefrom;
   said sleeve coaxially penetrating said ring orifice, the sleeve rotatable with respect to said ring;
   a rigid, cylindrical collar secured to said handle assembly ring and rotatable with said handle assembly;
   a thread assembly loosely secured to said sleeve that is adapted to be threadably coupled to said target, the thread assembly coaxial with said collar and axially deflectable with respect thereto, the thread assembly comprising tapered portions adapted to be contacted and compressed by said collar;
   wherein the thread assembly comprises a plurality of individual cooperating segments that are interconnected with one another and which are radially displaceable inwardly or outwardly.

9. The adapter as defined in claim 8 wherein said sleeve comprises a peripheral ring groove, and each segment comprises an integral, internal foot that fits within the peripheral ring groove to secure the thread assembly.

10. The adapter as defined in claim 9 wherein the segments are coupled together by springs that bias the segments towards each other.

11. The adapter as defined in claim 10 wherein the sleeve comprises a terminus and the segments comprise an internal ring groove, and the terminus concentrically fits within the internal ring groove of each segment.

* * * * *